US012570141B2

(12) United States Patent
Oszwald et al.

(10) Patent No.: US 12,570,141 B2
(45) Date of Patent: Mar. 10, 2026

(54) VEHICLE FUEL STORAGE SYSTEM INCLUDING BLADDER

(71) Applicant: Plastic Omnium Advanced Innovation and Research, Brussels (BE)

(72) Inventors: Pierre Oszwald, Brussels (BE); Dominique Madoux, Brussels (BE); Changwook Shin, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 18/857,544

(22) PCT Filed: Apr. 20, 2023

(86) PCT No.: PCT/EP2023/060235
§ 371 (c)(1),
(2) Date: Oct. 17, 2024

(87) PCT Pub. No.: WO2023/203117
PCT Pub. Date: Oct. 26, 2023

(65) Prior Publication Data
US 2025/0170886 A1 May 29, 2025

(30) Foreign Application Priority Data

Apr. 21, 2022 (BE) .................................. 2022/5299

(51) Int. Cl.
*B60K 15/03* (2006.01)

(52) U.S. Cl.
CPC .... *B60K 15/03* (2013.01); *B60K 2015/03092* (2013.01); *B60K 2015/03486* (2013.01)

(58) Field of Classification Search
CPC ........... B60K 2015/03092; B60K 2015/03486; B60K 15/03; B60K 2015/03085;
(Continued)

(56) References Cited

U.S. PATENT DOCUMENTS

| | | | | |
|---|---|---|---|---|
| 4,613,444 A | * | 9/1986 | Lane | ...................... C09K 5/063 |
| | | | | 126/400 |
| 6,108,489 A | * | 8/2000 | Frohlich | ............... F28D 20/028 |
| | | | | 392/339 |

(Continued)

FOREIGN PATENT DOCUMENTS

| | | |
|---|---|---|
| CN | 112477588 A | 3/2021 |
| DE | 10 2015 102 573 A1 | 8/2015 |

(Continued)

OTHER PUBLICATIONS

International Search Report & Written Opinion issued on Jun. 16, 2023, in PCT/EP2023/060235 filed on Apr. 20, 2023, 8 pages.

(Continued)

*Primary Examiner* — Stephen J Castellano
(74) *Attorney, Agent, or Firm* — Oblon, McClelland, Maier & Neustadt, L.L.P.

(57) ABSTRACT

A fuel storage system may be configured for a vehicle and may include a fuel tank, at least one inflatable bladder extending inside the tank, and at least one heat storage member, extending inside the tank, comprising a phase change material having a melting point in a range of from 18 to 40° C. The heat storage member may be attached to a bottom wall of the tank and/or attached to the bladder. The system may include several heat storage members.

13 Claims, 2 Drawing Sheets

(58) Field of Classification Search
CPC ........... B60K 2015/03072; B60K 2015/03414;
B60K 2015/0772
See application file for complete search history.

(56) References Cited

U.S. PATENT DOCUMENTS

| | | | | |
|---|---|---|---|---|
| 6,190,427 | B1 * | 2/2001 | Ahmed | C10L 10/02 |
| | | | | 44/418 |
| 2004/0231829 | A1 * | 11/2004 | Amano | F28D 20/02 |
| | | | | 165/104.12 |
| 2009/0229580 | A1 * | 9/2009 | Kopinsky | B60K 15/03504 |
| | | | | 123/519 |
| 2011/0203947 | A1 | 8/2011 | Ogawa | |
| 2015/0240759 | A1 | 8/2015 | Lopes | |
| 2020/0139809 | A1 | 5/2020 | Harms et al. | |
| 2020/0406745 | A1 | 12/2020 | Arras et al. | |
| 2022/0040627 | A1 * | 2/2022 | Seki | B01J 20/20 |

FOREIGN PATENT DOCUMENTS

| | | |
|---|---|---|
| DE | 10 2017 210 574 A1 | 12/2018 |
| DE | 10 2018 203 006 A1 | 8/2019 |
| EP | 1 566 535 A2 | 8/2005 |
| JP | 9-203359 A | 8/1997 |
| JP | 11-11167 A | 1/1999 |
| JP | 2004-324562 A | 11/2004 |
| WO | WO 01/21991 A1 | 3/2001 |
| WO | WO 2021/013940 A1 | 1/2021 |

OTHER PUBLICATIONS

Japanese Office Action issued Apr. 1, 2025 in Japanese Patent Application No. 2024-561895 with English translation, 7 pgs.
Chinese Office Action and Search Report issued Mar. 27, 2025 in Chinese Patent Application No. 202380035433.8 with English translation, 14 pgs.

* cited by examiner

VEHICLE FUEL STORAGE SYSTEM INCLUDING BLADDER

CROSS-REFERENCE TO RELATED APPLICATIONS

The present application is the national stage of international application PCT/EP2023/060235, filed on Apr. 20, 2023, and claims the benefit of the filing date of Belgian Appl. No. 20225299, filed on Apr. 21, 2022.

The invention relates to vehicle fuel tanks. More particularly, the invention relates to a vehicle fuel storage system.

The fuel stored in a vehicle's fuel tank is subject to temperature fluctuations that depend mainly on the outside temperature. Depending on the climate to which the vehicle is exposed, fuel temperature can vary greatly, especially if the vehicle is outdoors when driving or parked. When the temperature of the fuel stored in the tank rises, some of it evaporates. As the tank defines a closed volume, the generation of fuel vapor leads to a rise in pressure in the gaseous phase inside the tank. High fuel vapor pressure generates mechanical stresses on the tank walls, which can damage them or at the very least constitute a risk of tank explosion if the pressure rise is not controlled.

It is known in the prior art, for example from document WO 2021/013940 A1, to place an inflatable bladder inside the fuel tank. This bladder is connected to an air inlet and outlet pipe leading from the fuel tank, enabling air to be alternately supplied to the bladder or discharged from it. This way, depending on the fluctuation in the amount of fuel vapor in the tank, the bladder can inflate or deflate to modify the volume available for fuel vapor and thus limit variations in fuel vapor pressure. Mention may also be made of DE 10 2018 203006 A1, which discloses a vehicle fuel storage system according to the preamble of claim 1.

Although this bladder system reduces the risk of pressure peaks in the fuel tank, it does pose certain problems. Specifically, the volume of the bladder inside the fuel tank is volume that cannot be occupied by fuel, so the presence of the bladder limits the useful capacity of the tank. For example, for a 45-liter fuel tank, the bladder needs to have a volume of around 20 liters to have a significant beneficial effect, which almost halves the useful volume of the tank. In addition, the large volume of the bladder makes it complex to insert into the tank while the tank is being manufactured, which in turn increases the cost and time required to manufacture the tank. In addition, the presence of the bladder inside the tank creates a bias which can distort the measurement of the fuel level in the tank, the bias residing in the uncertainty about the shape taken by the bladder, particularly when it is only partially inflated.

In particular, the invention aims to solve the problems identified in the prior art by limiting the pressure build-up of fuel vapor in the tank and avoiding or mitigating the disadvantages posed by the prior art bladder and its large volume.

To this end, the invention relates to a fuel storage device for a motor vehicle comprising:
  a fuel tank,
  at least one inflatable bladder extending inside the tank, and
  at least one heat storage member, extending inside the tank, comprising a phase-change material with a melting point between 18° and 40° C.

The at least one heat storage member can absorb heat, particularly when the fuel has a temperature close to the melting point of the phase-change material. Since the fusion reaction is endothermic, it consumes heat from the fuel. The at least one heat storage member limits the temperature rise of the fuel and therefore the generation of fuel vapor in the tank. Thanks to this limitation of fuel vapor generation, the bladder can be sized with a smaller volume, thus reducing the disadvantages associated with bladder volume, namely the limitation of the useful tank volume, the uncertainty of fuel level measurement and the complexity of introducing the bladder into the tank during its manufacture. This means that the combined effects of the at least one heat storage member and the bladder outweigh the effects of the at least one heat storage member and the bladder on their own.

Furthermore, tests have shown that the use of heat storage members is more effective in reducing fuel vapor pressure rises in small-volume fuel tanks, while the bladder is more effective in reducing fuel vapor pressure rises in large-volume fuel tanks. By combining these two technologies, a certain efficiency is ensured in reducing fuel vapor pressure rises, whatever the volume of the tank.

According to a first embodiment of the invention, the at least one heat storage member is attached to a bottom wall of the tank.

This ensures that the at least one heat storage member is immersed in the fuel as long as the tank contains fuel, and therefore that the at least one heat storage member remains in thermal contact with the fuel at all times.

In a second embodiment of the invention, the at least one heat storage member is attached to the at least one bladder.

The at least one heat storage member thus gives weight to the bladder wall. This makes it easier to open when it is filled with air. This also helps to break the waves of fuel moving through the tank while the vehicle is traveling, so that the at least one heat storage member imparts an "anti-sloshing" function to the bladder.

According to a third embodiment of the invention, the at least one heat storage member is in the form of a floating body configured to float on the fuel in the tank.

The at least one heat storage member is then in the form of a float. This means that the heat storage member does not need to be attached to the tank, which makes the fuel storage system easier to manufacture. In addition, it is ensured that the at least one heat storage member remains in thermal contact with the fuel at all times.

Advantageously, the fuel storage system comprises several heat storage members.

This increases the capacity of the heat storage members to absorb heat from the fuel. In addition, the components can be positioned at different locations in the tank, thus homogenizing the heat exchange between the fuel and the heat storage components, and thus homogenizing the fuel temperature. This helps limit fuel vapor generation in the tank.

Preferably, the heat storage members are attached to a support plate configured to float on the fuel in the tank. Preferentially, the support plate is equipped with floats.

The plate helps to maintain a certain arrangement of the components in the tank's interior space, thus preventing all the components from clustering together locally in the tank. In other words, the plate ensures that the components are evenly distributed throughout the tank volume.

Advantageously, the phase-change material has a melting point between 20° and 30° C.

The melting point is thus at a temperature that is commonly reached by the fuel, so that the heat storage members are effective in limiting the temperature rise of the fuel during melting of the phase-change material.

Advantageously, the phase-change material is selected from the following list: calcium chloride hexahydrate (CaCl$_2$.6H$_2$O), octadecane (C$_{18}$H$_{38}$), cyclohexanol (C$_6$H$_{12}$O), a glycerine derivative.

These materials have melting points close to 25° C., making them particularly suitable for the invention.

Advantageously, the fuel storage system comprises several heat storage members, the heat storage members being attached to a bottom wall of the tank and/or attached to the at least one bladder and/or made in the form of floating bodies configured to float on the fuel in the tank.

In this way, the three embodiments can be combined to place the heat storage members at different locations in the tank, making the invention adaptable to different tank configurations.

BRIEF DESCRIPTION OF THE FIGURES

The invention will be better understood upon reading the following description, which is provided merely as example and with reference to the appended drawings, wherein:

FIG. 4 is a schematic view of a vehicle fuel storage system according to a third embodiment of the invention, and FIG. 5 is a schematic view of a vehicle fuel storage system according to a variant to the third embodiment of the invention.

Figures 1, 2, 3:
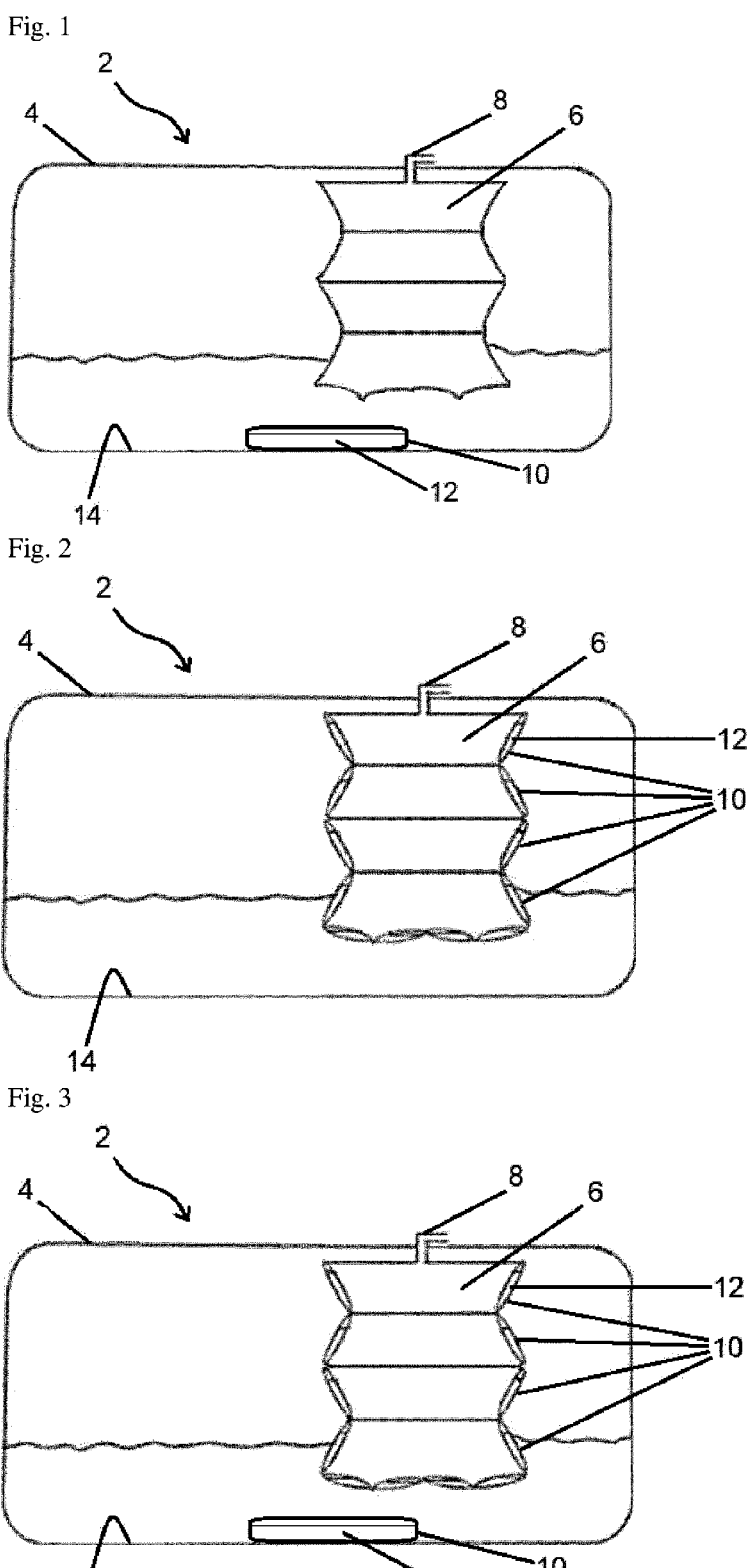
FIG. 1 is a schematic view of a vehicle fuel storage system according to a first embodiment of the invention.
FIG. 2 is a schematic view of a vehicle fuel storage system according to a second embodiment of the invention.
FIG. 3 is a schematic view of a vehicle fuel storage system according to a variant to the second embodiment of the invention.

A vehicle fuel storage system 2 according to a first embodiment of the invention is shown in FIG. 1.

The fuel storage system 2 comprises a fuel tank 4, generally made of plastic, configured to store the fuel used by the vehicle, notably for its propulsion. The tank 4 defines an internal volume into which the fuel extends in both liquid and gaseous form, according to a distribution that depends in particular on the pressure and temperature conditions inside the tank 4. The tank generally comprises a filler pipe for filling the tank with fuel, a vent pipe for evacuating fuel vapors under certain conditions, and an injection pipe for delivering fuel to the vehicle engine. These three pipes are well known to the prior art, so they are not shown on the figures and will not be described further in the following.

The fuel storage system 2 comprises an inflatable bladder 6 extending inside the fuel tank 4. The bladder 6 has a resiliently deformable wall allowing it to be inflated and deflated without plastic deformation. To this end, the fuel storage system 2 comprises an air supply pipe 8 connected on the one hand to the bladder 6 and on the other hand to an air supply system (not shown) located outside the tank 4. Thanks to the air supply pipe 8, it is possible, alternately, to fill the bladder 6 with air so that it occupies a larger volume in the tank 4 and to evacuate part of the air contained in the bladder 6 so that it occupies a smaller volume in the tank 4.

The fuel storage system 2 comprises at least one heat storage member 10, extending inside the tank 4, configured to exchange heat with the fuel. In FIG. 1, the fuel storage system 2 has one heat storage member 10, but it is possible to equip the system with several heat storage members, for example two or more.

The heat storage member 10 comprises a phase-change material 12 housed in an enclosure that is impermeable to this material and to the fuel, so that the enclosure does not allow material exchange between the fuel and the heat storage member 10. On the other hand, the enclosure of the heat storage unit 10 is heat-conducting, so that it allows heat exchange between the fuel and the phase-change material 12. The phase-change material 12 has a melting point between 18° and 40° C. By way of example, the phase-change material is selected from the following list: calcium chloride hexahydrate (CaCl$_2$.6H$_2$O), octadecane (C$_{18}$H$_{38}$), cyclohexanol (C$_6$H$_{12}$O), a glycerine derivative. More preferably, the phase-change material has a melting point between 20° and 30° C., i.e. close to the temperature range within which the fuel temperature is found.

In this embodiment, the heat storage member 10 is attached to a bottom wall 14 of the tank 4, on the inside of the tank.

As the fuel temperature rises, for example when the outside temperature exceeds the fuel temperature, some of the fuel evaporates, generating fuel vapor in the tank 4. Since the tank 4 defines a closed volume, increasing the amount of fuel vapor increases the pressure in the gas phase inside the tank. It will now be described how the fuel storage system 2 according to the invention makes it possible to limit this pressure increase.

On the one hand, the bladder 6 is compressed under the action of the pressure in the gas phase inside the tank 4. As the wall of the bladder 6 is deformable, a balance of stresses on this wall is established, leading to the evacuation of some of the air contained in the bladder 6 by means of the air supply line 8. In this way, the volume of the bladder 6 extending into the tank 4 decreases, and the volume occupied by the fuel vapor increases, resulting in a reduction in fuel vapor pressure. When the fuel temperature eventually drops, for example when the outside temperature falls below the fuel temperature, some of the fuel vapor condenses. This reduces the amount of fuel vapor in the tank, as well as the fuel vapor pressure. A new equilibrium of stresses on the bladder wall is established, leading to a filling of bladder 6 by means of air supply line 8 and an increase in the volume of bladder 6 extending into the tank 4.

On the other hand, the heat storage member 10 has a thermal capacity that enables it to absorb some of the heat from the fuel. When the temperature of the heat storage member 10 reaches the melting point of the phase-change material 12, that material begins to melt. As the melting reaction is endothermic, the phase-change material 12 absorbs heat from the fuel to supply this reaction, thus limiting the temperature rise of the fuel. In other words, the increase in fuel vapor pressure in the tank is limited by limiting the increase in fuel temperature.

A vehicle fuel storage system 2 according to a second embodiment of the invention is shown in FIG. 2. In this figure, elements similar to those in the previous figure are designated by identical references.

The vehicle fuel storage system 2 in FIG. 2 differs from that in FIG. 1 in that it comprises several heat storage members 10, all of which are attached to the wall of the bladder 6. This configuration helps the bladder to deploy more easily as it fills with air, and to break waves of fuel as it moves through the tank while the vehicle is traveling, so that the heat storage members 10 impart an "anti-sloshing" function to the bladder 6.

A vehicle fuel storage system 2 according to a variant to the second embodiment of the invention is shown in FIG. 3. In this figure, elements similar to those in the previous figures are designated by identical references.

The vehicle fuel storage system 2 of FIG. 3 differs from that of FIG. 2 in that it additionally comprises at least one heat storage member 10 attached to the bottom wall 14 of the tank, in addition to those attached to the bladder wall 6. In this way, we obtain the technical effects conferred by these two positions of the heat storage members presented above.

Figures 4, 5:
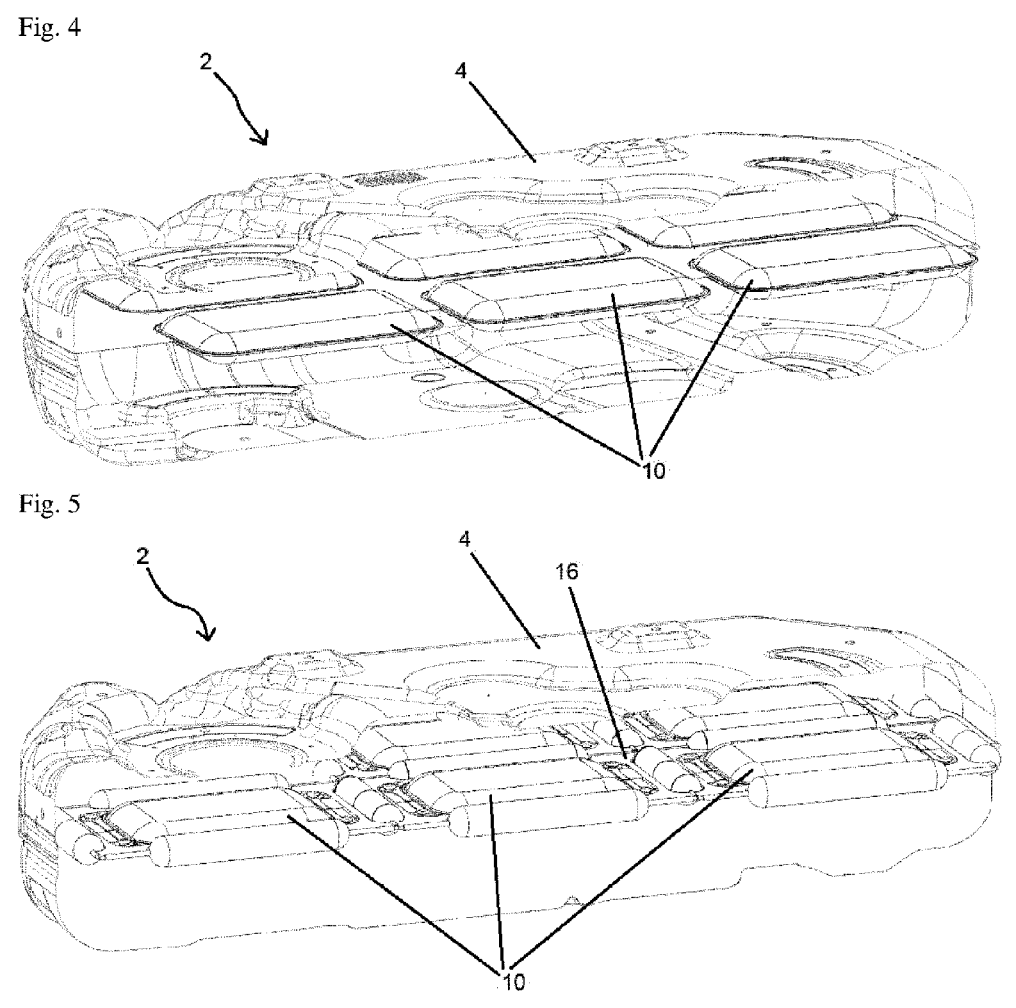

A vehicle fuel storage system 2 according to a third embodiment of the invention is shown in FIG. 4. In this figure, elements similar to those in the previous figures are designated by identical references.

The vehicle fuel storage system 2 shown in FIG. 4 differs from that of the previous figures in that it comprises several heat storage members 10 in the form of floating bodies configured to float on the fuel in the tank 4. This ensures that the heat storage members 10 are constantly in contact with the fuel and therefore able to exchange heat efficiently with the fuel. The bladder and air supply line have not been shown in FIG. 4 in order to make the figure more legible, but the vehicle fuel storage system 2 does comprises the bladder and air supply line as described above.

A vehicle fuel storage system 2 according to a variant to the third embodiment of the invention is shown in FIG. 5. In this figure, elements similar to those in the previous figures are designated by identical references.

The vehicle fuel storage system 2 in FIG. 5 differs from that in FIG. 4 in that the heat storage members are attached to a support plate 16 configured to float on the fuel in the tank 4. In addition to ensuring good thermal contact between the heat storage members 10 and the fuel, the support plate 16 ensures that the heat storage members 10 are evenly distributed throughout the volume of the tank 4 and not concentrated in one area. This prevents part of the fuel, away from the heat storage members 10, from having a higher temperature than the rest of the fuel, which could lead to the generating of fuel vapor. The bladder and air supply line have not been shown in FIG. 5 in order to make the figure more legible, but the vehicle fuel storage system 2 does comprises the bladder and air supply line as described above.

The invention is not limited to the embodiments presented, and other embodiments will become clearly apparent to the person skilled in the art. In particular, it is possible to combine each of the above-mentioned embodiments and variants, and in particular to combine the different positions and configurations of the heat storage members.

LIST OF REFERENCES

2: fuel storage system
4: tank
6: bladder
8: air supply line

10: heat storage member
12: phase-change material
14: bottom wall
16: support plate

The invention claimed is:

1. A fuel storage device configured for a motor vehicle, the device comprising:
   a fuel tank;
   an inflatable bladder extending inside the fuel tank; and
   a first heat storage member, extending inside the fuel tank, comprising a phase-change material with a melting point in a range of from 18 to 40° C.,
   wherein the first heat storage member is attached to the inflatable bladder.

2. The device of claim 1, further comprising:
   a second heat storage member,
   wherein the second heat storage member is attached to a bottom wall of the tank.

3. The device of claim 1, further comprising:
   a second heat storage member,
   wherein the second heat storage member is constructed as a floating body configured to float on a fuel in the tank.

4. The device of claim 1, further comprising:
   further heat storage members.

5. The device of claim 4, wherein the further heat storage members are attached to a support plate configured to float on a fuel in the tank.

6. The device of claim 1, wherein the phase-change material has a melting point in a range of from 20 to 30° C.

7. The device of claim 1, wherein the phase-change material comprises calcium chloride hexahydrate, octadecane, cyclohexanol, and/or a glycerine derivative.

8. The device of claim 1, further comprising:
   a second heat storage member.

9. The device of claim 1, wherein the phase-change material comprises calcium chloride hexahydrate.

10. The device of claim 1, wherein the phase-change material comprises octadecane.

11. The device of claim 1, wherein the phase-change material comprises cyclohexanol.

12. The device of claim 1, wherein the phase-change material comprises a glycerine derivative.

13. The device of claim 1, further comprising:
   further heat storage members,
   wherein the further heat storage members are attached to the inflatable bladder.

* * * * *